US012775733B2

(12) United States Patent
Sotoudeh Nia

(10) Patent No.: US 12,775,733 B2
(45) Date of Patent: Oct. 27, 2026

(54) ANTI-SCRAPING METHOD AND SYSTEM FOR PROTECTION OF TEXT-BASED DATA

(71) Applicant: Parsa Sotoudeh Nia, Tehran (IR)

(72) Inventor: Parsa Sotoudeh Nia, Tehran (IR)

( * ) Notice: Subject to any disclaimer, the term of this patent is extended or adjusted under 35 U.S.C. 154(b) by 82 days.

(21) Appl. No.: 18/693,523

(22) PCT Filed: May 10, 2023

(86) PCT No.: PCT/IB2023/054818
§ 371 (c)(1),
(2) Date: Mar. 20, 2024

(87) PCT Pub. No.: WO2024/069250
PCT Pub. Date: Apr. 4, 2024

(65) Prior Publication Data

US 2025/0139278 A1 May 1, 2025

Related U.S. Application Data

(60) Provisional application No. 63/412,388, filed on Oct. 1, 2022.

(51) Int. Cl.
*G06F 21/62* (2013.01)
*G06F 40/109* (2020.01)
*G06F 40/143* (2020.01)

(52) U.S. Cl.
CPC ........ *G06F 21/6227* (2013.01); *G06F 40/109* (2020.01); *G06F 40/143* (2020.01)

(58) Field of Classification Search
CPC .. G06F 21/6227; G06F 40/109; G06F 40/143; G06F 21/6209; G06F 21/10
See application file for complete search history.

(56) References Cited

U.S. PATENT DOCUMENTS

| | | | | |
|---|---|---|---|---|
| 9,075,990 | B1 * | 7/2015 | Yang | H04L 63/20 |
| 9,906,514 | B1 | 2/2018 | Podemsky | |
| 10,878,186 | B1 * | 12/2020 | Liu | G06V 30/40 |
| 11,140,235 | B1 | 10/2021 | Vilcinskas et al. | |
| 11,356,433 | B2 | 6/2022 | Krylov et al. | |
| 2006/0200339 | A1 * | 9/2006 | Satake | G06F 40/55 704/4 |
| 2008/0109462 | A1 * | 5/2008 | Adams | G06Q 10/107 |
| 2009/0319782 | A1 * | 12/2009 | Lee | G06F 21/34 713/172 |
| 2014/0022260 | A1 * | 1/2014 | Atteberry | G06T 11/203 345/467 |
| 2018/0276350 | A1 * | 9/2018 | Land | G06F 21/10 |
| 2022/0129618 | A1 * | 4/2022 | Sawaf | G06T 11/203 |

* cited by examiner

*Primary Examiner* — Michael Won

(57) ABSTRACT

An anti-scraping method for protection of text-based data. The text-based data includes an original string of characters. The anti-scraping method includes receiving a request from a user for sending the original string of characters, generating a shuffled font from an original font responsive to receiving the request from the user, generating a shuffled string of characters from the original string of characters based on the shuffled font, and sending the shuffled font and the shuffled string to the user. The original font includes a plurality of font characters and a plurality of original glyphs. The shuffled string is different from the original string.

9 Claims, 5 Drawing Sheets

100

ANTI-SCRAPING METHOD AND SYSTEM FOR PROTECTION OF TEXT-BASED DATA

TECHNICAL FIELD

The present disclosure generally relates to anti-scraping methods, and particularly, to protection of text-based data from robotic scraping.

BACKGROUND ART

There are several websites that contain lots of valuable textual data and information in terms of commercial benefit and production cost. For this reason, although contents of these websites are meant to be exposed to ordinary users, such contents may have to be prevented from scraping (for example, by robots that may grab all the information on a website in a short period of time and at a small cost). Online book publishers, search engines, social networks, and scientific journals, online academies, analytic websites, online shops, news agencies, and knowledge bases are examples of websites that contain valuable information that despite public availability, utilize various mechanisms to protect their contents against mass and machine requests from a single origin.

0003| Currently, web servers generally detect suspicious behaviors based on differences between human and machine behavior in interacting with a web page [U.S. Pat. No. 9,906,514 B1, U.S. Pat. No. 11,140,235 B1, and U.S. Pat. No. 11,356,433 B2]. For example, a number of machine requests per unit of time may be much larger than ordinary and natural requests of a human interacting with a site. If a number of requests from a certain source is more than normal, web servers may use various mechanisms to detect sources of requests and block further requests from such sources. In some cases, continuation of an activity may be conditional on a recognition of a security image or CAPTCHA. However, if a machine with standard specifications of a well-known browser starts sending requests and pauses at random period of times between successive requests and substantially imitates behavior of human beings in terms of the number of requests per unit of time, conventional robotic scraping detection algorithms may be bypassed. Also, if a machine can use a proxy to send each request from a random IP address to a website, these requests may be hidden among a multitude of requests from real users.

There is, therefore, a need for an anti-scraping method and system that may be robust against scrapers that imitate normal human-based requests. There is also a need for an anti-scraping method and system that may protect textual information from scraping, regardless of the nature of scrapers.

SUMMARY OF THE DISCLOSURE

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes an exemplary anti-scraping method for protection of text-based data. An exemplary text-based data may include an original string of characters. An exemplary anti-scraping method may include receiving a request from a user for sending the original string of characters, generating a shuffled font from an original font responsive to receiving the request from the user, generating a shuffled string of characters from the original string of characters based on the shuffled font, and sending the shuffled font and the shuffled string to the user. An exemplary original font may include a plurality of font characters and a plurality of original glyphs. An exemplary shuffled string may be different from the original string.

In an exemplary embodiment, generating the shuffled font may include generating a plurality of shuffled glyphs by randomly shuffling the plurality of original glyphs. An exemplary shuffled font may include the plurality of font characters and the plurality of shuffled glyphs.

An exemplary anti-scraping method may further include randomly generating a pattern and overlaying the pattern on a string of glyphs. An exemplary string of glyphs may represent the shuffled string. In an exemplary embodiment, each respective glyph in a string of glyphs may include a respective shuffled glyph of the plurality of shuffled glyphs.

An exemplary anti-scraping method may further include randomly generating a plurality of patterns and overlaying each respective pattern of the plurality of patterns on a respective shuffled glyph of the plurality of shuffled glyphs. An exemplary anti-scraping method may further include displaying the shuffled string on a display unit utilizing the shuffled font. An exemplary anti-scraping method may further include extracting the text-based data from a hypertext markup language (HTML) document.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DESCRIPTION OF EMBODIMENTS

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for protection of text-based data from scraping, i.e., unauthorized gathering of text-based data. An exemplary method may shuffle an original font by which text-based data is represented upon receiving a request for sending data to an exemplary user. As a result, an exemplary text-based data may be transferred to the user by a shuffled font. However, an exemplary method may produce glyphs of the shuffled font based on exemplary original font so that an exemplary text-based data may be graphically represented to the user as the original text. Therefore, an exemplary user may be able to read and understand an exemplary text-based data but if an exemplary text-based data is copied or transferred elsewhere, exemplary transferred text may be represented as a shuffled string that may be unintelligible. Since an exemplary method may generate a shuffled font randomly upon receiving each separate request from a user, it may be difficult and costly to restore original text from the shuffled text after receiving by a scraper. As a result, an exemplary text-based data may be protected from manual or artificial intelligence (AI)-based scraping methods.

Figure 1:
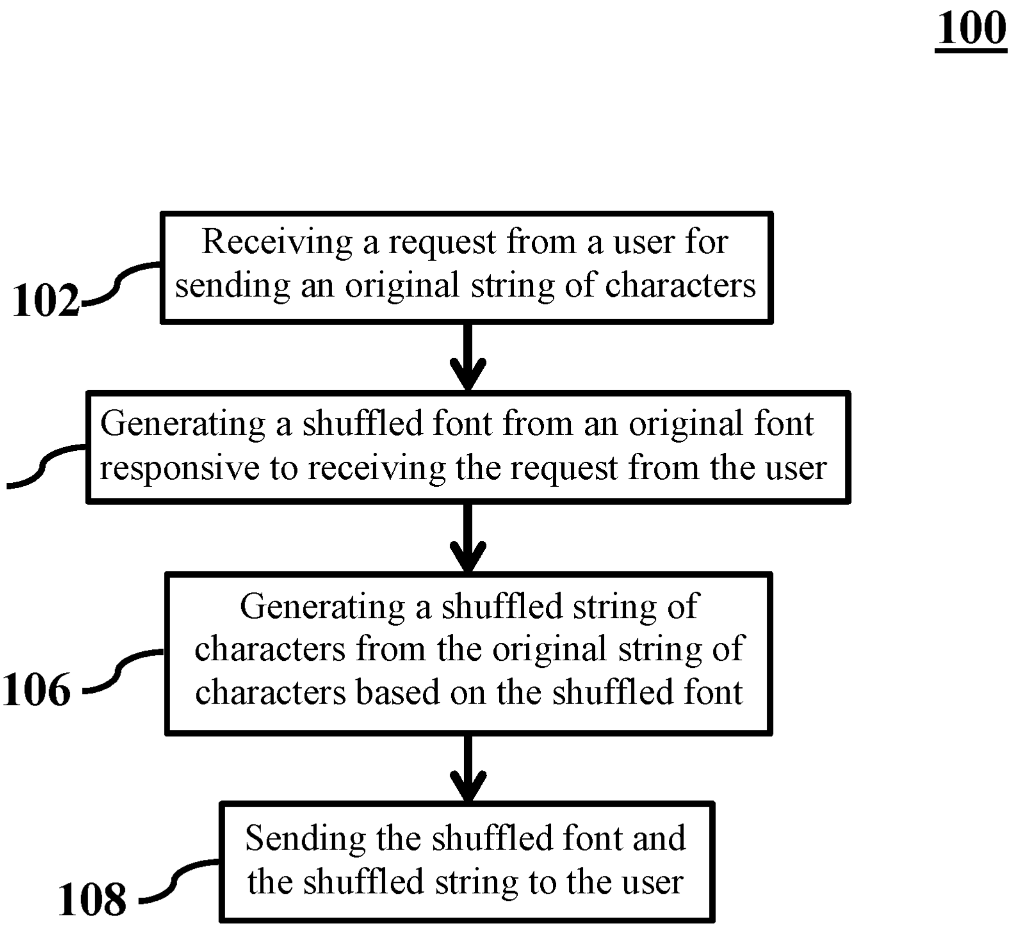
FIG. 1 shows a flowchart of an anti-scraping method for protection of text-based data, consistent with one or more exemplary embodiments of the present disclosure.

FIG. 1 shows a flowchart of an anti-scraping method for protection of text-based data, consistent with one or more exemplary embodiments of the present disclosure. An exemplary text-based data may include an original string of characters. An exemplary anti-scraping method 100 may include receiving a request from a user for sending the original string of characters (step 102), generating a shuffled font from an original font responsive to receiving the request from the user (step 104), generating a shuffled string of characters from the original string of characters based on the shuffled font (step 106), and sending the shuffled font and the shuffled string to the user (step 108). An exemplary shuffled string may be different from the original string.

In an exemplary embodiment, step 102 may include receiving a request from a user for sending the original string of characters. In an exemplary embodiment, a "string of characters" may refer to a sequence of letters, numbers, or other symbols that may be written, printed, or displayed in different fonts. For example, "dcba" is a string of characters that includes four English letters. An exemplary user may request access to a database that may include text-based data. In an exemplary embodiment, the user's request may be received by a processor that may have access to the database. For example, the user may click on a link of a web site that contains text. As a result, an exemplary processor may receive a request from the user in step 102 to provide an access to the web site for the user. In an exemplary embodiment, the original string of characters may be processed and a processed result may be sent to the user if the user gains access to the database, as described below. For example, contents of a web page may be sent to the user by displaying the web page on a display unit that is accessible for the user.

Figure 2:
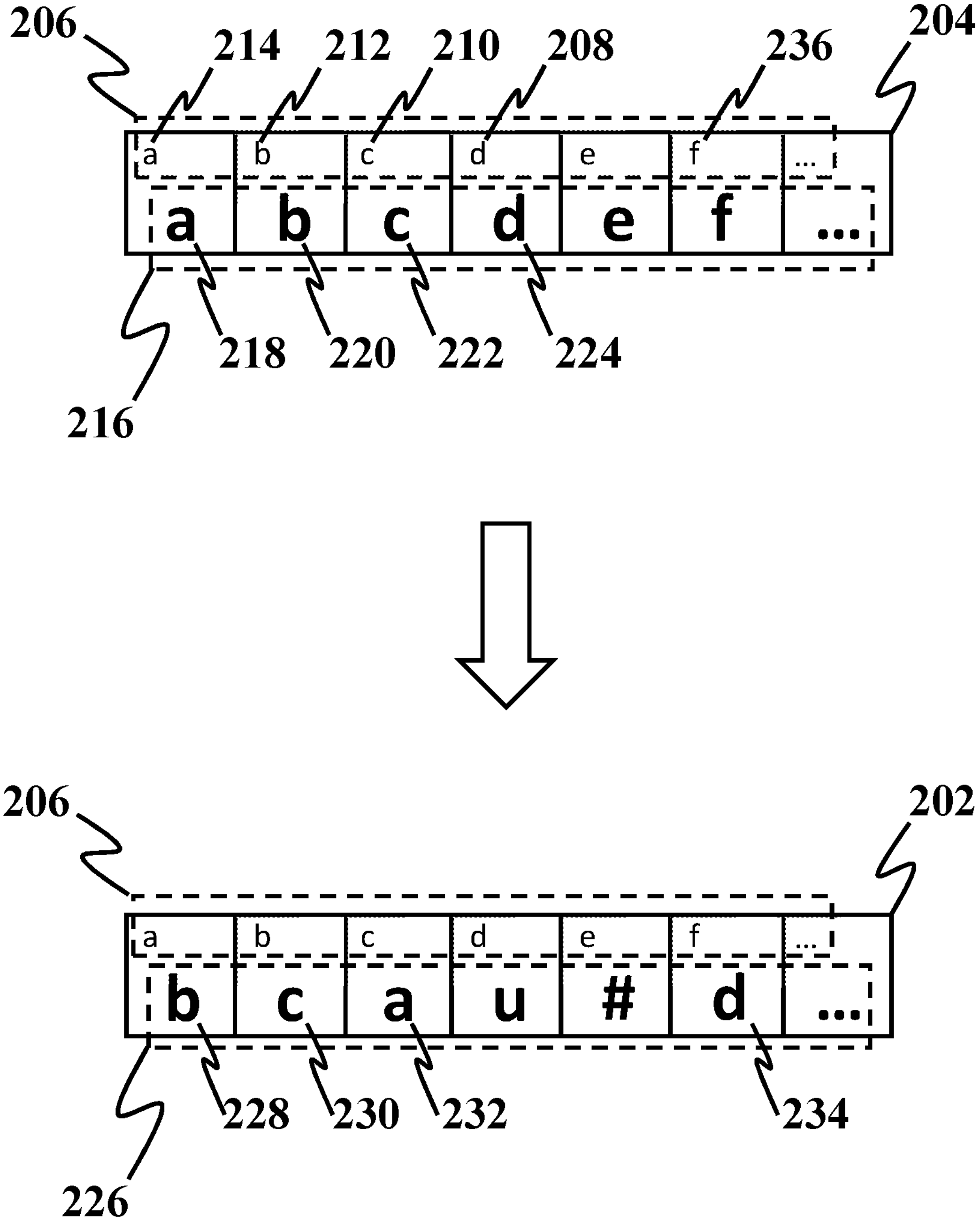
FIG. 2 shows a schematic for generating a shuffled font from an original font, consistent with one or more exemplary embodiments of the present disclosure.

In further detail with respect to step 104, FIG. 2 shows a schematic for generating a shuffled font from an original font, consistent with one or more exemplary embodiments of the present disclosure. In an exemplary embodiment, step 104 may include generating a shuffled font 202 from an original font 204 responsive to receiving the request from the user. In an exemplary embodiment, a "font" may refer to a graphical representation of characters. Each exemplary font may include a different typeface, point size, weight, color, or design. In an exemplary embodiment, an "original font" may refer to a font with conventional characteristics (such as typeface, point size, weight, color, or design) that may be used to represent each character in the original string of characters. In an exemplary embodiment, original font 204 may include a plurality of font characters 206 that may be sorted in a font structure in a conventional format. Each exemplary character in the original string of characters may be made of a corresponding font character of plurality of font characters 206. For example, in an original string "dcba", character "d" may be made of a fourth font character 208 of plurality of font characters 206, character "c" may be made of a third font character 210 of plurality of font characters 206, character "b" may be made of a second font character 212 of plurality of font characters 206, and character "a" may be made of a first font character 214 of plurality of font characters 206.

In an exemplary embodiment, original font 204 may further include a plurality of original glyphs 216. In an exemplary embodiment, a "glyph" may refer to a specific shape, design, or representation of a character. An exemplary $n^{th}$ original glyph of plurality of original glyphs 216 may represent an $n^{th}$ font character of plurality of font characters 206 where $1 \le n \le N$ and N is a number of plurality of font characters 206. For example, a first ($1^{st}$) original glyph 218 of plurality of original glyphs 216 may represent first ($1^{st}$) font character 214, a second ($2^{nd}$) original glyph 220 of plurality of original glyphs 216 may represent second ($2^{nd}$) font character 212, a third ($3^{rd}$) original glyph 222 of plurality of original glyphs 216 may represent third ($3^{rd}$) font character 210, and a fourth (4th) original glyph 224 of plurality of original glyphs 216 may represent fourth ($4^{th}$) font character 208.

In an exemplary embodiment, generating shuffled font 202 in step 104 may include generating a plurality of shuffled glyphs 226 by randomly shuffling plurality of original glyphs 216. For this purpose, in an exemplary embodiment, plurality of original glyphs 216 may be randomly shuffled so that a new random permutation of fonts may be obtained. In an exemplary embodiment, different shuffling methods may be utilized for shuffling plurality of original glyphs 216. For example, the Fisher-Yates shuffle method may be utilized for obtaining plurality of shuffled glyphs 226 from plurality of original glyphs 216. An exemplary new arrangement of plurality of original glyphs 216 may form plurality of shuffled glyphs 226. In an exemplary embodiment, shuffled font 202 may include plurality of font characters 206 and plurality of shuffled glyphs 226. An exemplary $n^{th}$ shuffled glyph of plurality of shuffled glyphs 226 may represent the $n^{th}$ font character. For example, a first ($1^{st}$) shuffled glyph 228 of plurality of shuffled glyphs 226 may represent first ($1^{st}$) font character 214, a second ($2^{nd}$) shuffled glyph 230 of plurality of shuffled glyphs 226 may represent second ($2^{nd}$) font character 212, a third ($3^{rd}$) shuffled glyph 232 of plurality of shuffled glyphs 226 may represent third ($3^{rd}$) font character 210, and a sixth ($6^{th}$) shuffled glyph 234 of plurality of shuffled glyphs 226 may represent a sixth ($6^{th}$) font character 236 of plurality of font characters 206.

In an exemplary embodiment, step 106 may include generating a shuffled string of characters from the original string of characters based on shuffled font 202. An exemplary shuffled string may be generated by replacing an $i^{th}$ character in the original string with the $n^{th}$ font character responsive to the $i^{th}$ character being equal to a $j^{th}$ font character of plurality of font characters 206 and a $j^{th}$ original glyph of plurality of original glyphs 226 being equal to the $n^{th}$ shuffled glyph, where $1 \leq i \leq M$ and $1 \leq j \leq N$ where M is a length of the original string. Therefore, if an exemplary $i^{th}$ character in the original string is the same as the $j^{th}$ font character (which may be represented by the $j^{th}$ original glyph in original font 204) and the $j^{th}$ original glyph is the same as the $n^{th}$ shuffled glyph, the $i^{th}$ character in the original string may be replaced with the $n^{th}$ font character to produce the shuffled string. As a result, in an exemplary embodiment, the original string and the shuffled string may be represented with a same string of glyphs. For example, an original string "dcba" may be converted to a shuffled string as described below.

Referring to FIG. 2, in an exemplary embodiment, a first ($1^{st}$) character "d" in string "dcba" may be equal to fourth ($4^{th}$) font character 208 which is represented by fourth ($4^{th}$) original glyph 224 in original font 204. On the other hand, in an exemplary embodiment, fourth ($4^{th}$) original glyph 224 may be equal to sixth ($6^{th}$) shuffled glyph 234. As a result, in an exemplary embodiment, first ($1^{st}$) character "d" in string "dcba" may be replaced with sixth ($6^{th}$) font character 236, i.e., "f".

In an exemplary embodiment, a second ($2^{nd}$) character "c" in string "dcba" may be equal to third ($3^{rd}$) font character 210 which is represented by third ($3^{rd}$) original glyph 222 in original font 204. On the other hand, in an exemplary embodiment, third ($3^{rd}$) original glyph 222 may be equal to second ($2^{nd}$) shuffled glyph 230. As a result, in an exemplary embodiment, second ($2^{nd}$) character "c" in string "dcba" may be replaced with second ($2^{nd}$) font character 212, i.e., "b".

In an exemplary embodiment, a third ($3^{rd}$) character "b" in string "dcba" may be equal to second ($2^{nd}$) font character 212 which is represented by second ($2^{nd}$) original glyph 220 in original font 204. On the other hand, in an exemplary embodiment, second ($2^{nd}$) original glyph 220 may be equal to first ($1^{st}$) shuffled glyph 228. As a result, in an exemplary embodiment, third ($3^{rd}$) character "b" in string "dcba" may be replaced with first ($1^{st}$) font character 214, i.e., "a".

In an exemplary embodiment, a fourth ($4^{th}$) character "a" in string "dcba" may be equal to first ($1^{st}$) font character 214 which is represented by first ($1^{st}$) original glyph 218 in original font 204. On the other hand, in an exemplary embodiment, first ($1^{st}$) original glyph 218 may be equal to third ($3^{rd}$) shuffled glyph 232. As a result, in an exemplary embodiment, fourth ($4^{th}$) character "a" in string "dcba" may be replaced with third ($3^{rd}$) font character 210, i.e., "c". Based on the above discussion, in an exemplary embodiment, original string "dcba" may be converted to a shuffled string "fbac". In an exemplary embodiment, if shuffled string "fbac" is represented by shuffled font 202, shuffled string "fbac" may be represented as "dcba" (utilizing plurality of shuffled glyphs 226), which is the same as representing original string "dcba" with original font 204 (utilizing plurality of original glyphs 216).

In an exemplary embodiment, step 108 may include sending shuffled font 202 and the shuffled string to the user. For this purpose, an exemplary user may gain access to the shuffled string that is represented by shuffled font 202. In an exemplary embodiment, anti-scraping method 100 may further include displaying the shuffled string on a display unit utilizing shuffled font 202. As a result, an exemplary user may be able to read and understand the text-based data. However, an exemplary text-based data may be protected from scraping. For example, if the user copies original string "dcba" (for example, by selecting the string in a web site and selecting a "copy" command), shuffled string "fbac" may be actually copied since string "dcba" is only a representation of shuffled string "fbac". Therefore, if an exemplary text is transferred (manually or by artificial intelligence (AI)-based methods), the transferred text may become unintelligible by anti-scraping method 100 so that the original text may be protected. In addition, unlike cryptographic algorithms that increase the size of encrypted texts, text protection with anti-scraping method 100 does not lead to a change in a size of protected texts. Therefore, in an exemplary embodiment, anti-scraping method 100 may be efficiently utilized by a system (such as a web server) for protection of a large amount of text-based data without imposing additional storage burden on the system.

In an exemplary embodiment, anti-scraping method 100 may further include randomly generating a pattern. An exemplary pattern may be generated by randomly generating arrays of pixels in an area of a size of the shuffled string. In an exemplary embodiment, different random number generation methods may be utilized to obtain each pixel value. Exemplary andomly generated numbers may then be mapped to the brightness of corresponding pixels. For example, 0 may be mapped to a black pixel and 1 may be mapped to a white pixel.

In an exemplary embodiment, anti-scraping method 100 may further include overlaying the randomly generated pattern on a string of glyphs that may represent the shuffled string. In an exemplary embodiment, each respective glyph in a string of glyphs may include a respective shuffled glyph of plurality of shuffled glyphs 226. An exemplary pattern 302 may be overlaid on an exemplary string of glyphs by adding each pixel value of a representation of the string of glyphs to a corresponding pixel value of an exemplary pattern. As a result, in an exemplary embodiment, the string of glyphs may be protected from scraping methods that are based on image processing techniques, such as optical character recognition (OCR) since an exemplary pattern may change the appearance of the string of glyphs from a conventional text to a noisy text which may make it difficult to recognize the original text. Since, in an exemplary embodiment, the noisy text is obtained by a random process (i.e., overlaying a randomly generated pattern on the string of glyphs) developing an OCR method for scraping the text-based data may become even harder. As a result, an exemplary text-based data may be more resistant against scraping methods.

Figure 3A:
FIG. 3A shows a schematic of a plurality of patterns, consistent with one or more exemplary embodiments of the present disclosure.

In an exemplary embodiment, anti-scraping method 100 may further include randomly generating a plurality of patterns. FIG. 3A shows a schematic of a plurality of patterns, consistent with one or more exemplary embodiments of the present disclosure. Each pattern (for example, pattern 302) of an exemplary plurality of patterns 300 may be generated by randomly generating arrays of pixels in an area of a size of a font glyph. In an exemplary embodiment, different random number generation methods may be utilized to obtain each pixel value. Exemplary randomly generated numbers may then be mapped to the brightness of corresponding pixels. For example, 0 may be mapped to a black pixel and 1 may be mapped to a white pixel.

Figure 3B:
FIG. 3B shows a schematic of a string of glyphs overlaid by a plurality of patterns, consistent with one or more exemplary embodiments of the present disclosure.

In an exemplary embodiment, anti-scraping method 100 may further include overlaying each respective pattern of plurality of patterns 300 on a respective shuffled glyph of plurality of shuffled glyphs 226. FIG. 3B shows a schematic of a string of glyphs overlaid by a plurality of patterns, consistent with one or more exemplary embodiments of the present disclosure. An exemplary overlaid string of glyphs 304 may be obtained by overlaying each pattern of plurality of patterns 300 on a corresponding shuffled glyph of plurality of shuffled glyphs 226. For example, an overlaid glyph 306 may be obtained by overlaying pattern 302 on sixth ($6^{th}$) shuffled glyph 234 of FIG. 2. In an exemplary embodiment, pattern 302 may be overlaid on sixth ($6^{th}$) shuffled glyph 234 by adding each pixel value of sixth ($6^{th}$) shuffled glyph 234 to a corresponding pixel value of pattern 302. As a result, in an exemplary embodiment, each glyph in string of glyphs 304 may be mixed with a different visual noise. Therefore, an exemplary text-based data may become more resistant against scraping methods that are based on image processing techniques, such as OCR.

In an exemplary embodiment, the user may request to gain access to text-based data in a web page. Therefore, an exemplary text-based data may have to be extracted from a hypertext markup language (HTML) document. In an exemplary embodiment, HTML may refer to a standard markup language for creating web pages. In an exemplary embodiment, anti-scraping method 100 may further include extracting the text-based data from an HTML document. Therefore, an exemplary text-based data may have to be distinguished from HTML tags (i.e., pieces of markup language used to indicate the beginning and end of text-based data in an exemplary HTML document). For this purpose, in an exemplary embodiment, a binary string may be generated with an equal size of the HTML code that may include digits equal to 1 at locations corresponding to the string of characters and 0 elsewhere. For example, to send a string "Hello World" by method 100 from a web page, a corresponding HTML code may be as follows:

<p align="left">Hello<br>World</p>

Therefore, an exemplary binary string may be generated as follows to identify the text "Hello World" in the HTML code:

0000000000000000111110000111110000

As a result, an exemplary text may be sent to the user by method 100 as follows:

'<p align="left">kR6s #<br>4_f {Q</p> where an exemplary original string of characters "Hello World" are replaced with an exemplary shuffled string of characters "KR6s #4_f {Q". As a result, in an exemplary embodiment, original string of characters "Hello World" may be represented by a string of glyphs "Hello World" in the web page to the user but may be transferred as "KR6s #4_f {Q" if it is manually copied or grabbed by a machine.

Figure 4:
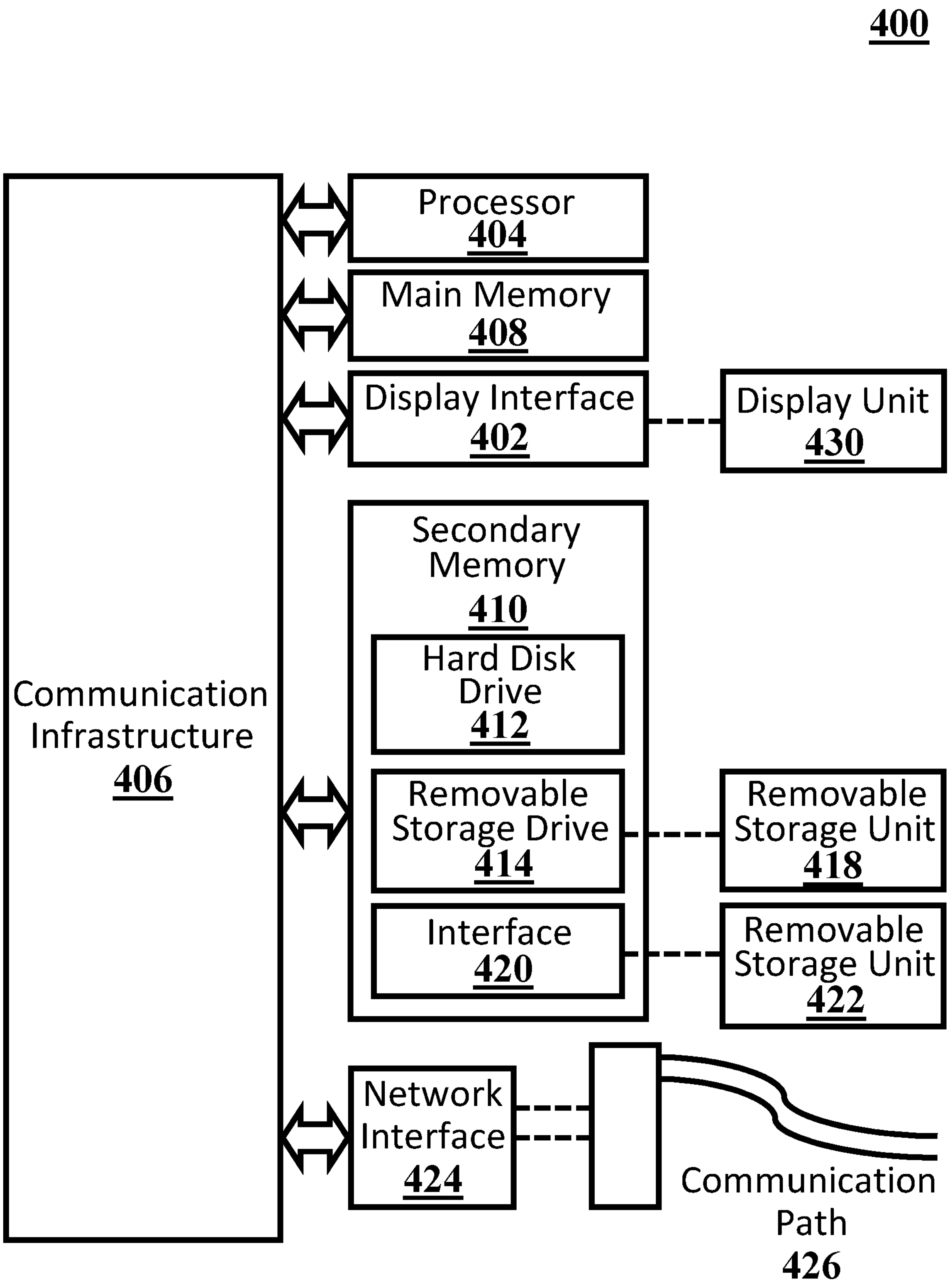
FIG. 4 shows a high-level functional block diagram of a computer system, consistent with one or more exemplary embodiments of the present disclosure.

FIG. 4 shows an example computer system 400 in which an embodiment of the present invention, or portions thereof, may be implemented as computer-readable code, consistent with exemplary embodiments of the present disclosure. For example, different steps of method 100 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-3B.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose (e.g., a graphical processing unit) or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 may be connected to a communication infrastructure 406, for example, a bus, message queue, network, or multi-core message-passing scheme.

In an exemplary embodiment, computer system 400 may include a display interface 402, for example a video connector, to transfer data to a display unit 430, for example, a monitor. Computer system 400 may also include a main memory 408, for example, random access memory (RAM), and may also include a secondary memory 410. Secondary memory 410 may include, for example, a hard disk drive 412, and a removable storage drive 414. Removable storage drive 414 may include a floppy disk drive, a magnetic tape drive, an optical disk drive, a flash memory, or the like. Removable storage drive 414 may read from and/or write to a removable storage unit 418 in a well-known manner. Removable storage unit 418 may include a floppy disk, a magnetic tape, an optical disk, etc., which may be read by and written to by removable storage drive 414. As will be appreciated by persons skilled in the relevant art, removable storage unit 418 may include a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424.

Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement different embodiments of the present disclosure as discussed herein. In particular, the computer programs, when executed, enable processor device 404 to implement the processes of the present disclosure, such as the operations in method 100 illustrated by flowchart of FIG. 1 discussed above. Accordingly, such computer programs represent controllers of computer system 400. Where an exemplary embodiment of method 100 is implemented using software, the software may be stored in a computer program product and loaded into computer system 400 using removable storage drive 414, interface 420, and hard disk drive 412, or communications interface 424.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. An anti-scraping method for protection of text-based data, the text-based data comprising an original string of characters, the anti-scraping method comprising:

receiving, utilizing one or more processors, a request from a user for sending the original string of characters;

generating, utilizing the one or more processors, a shuffled font from an original font responsive to receiving the request from the user, the original font comprising a plurality of font characters and a plurality of original glyphs, wherein:

an $n^{th}$ original glyph of the plurality of original glyphs represents an $n^{th}$ font character of the plurality of font characters where $1 \leq n \leq N$ and N is a number of the plurality of font characters, and generating the shuffled font comprises generating a plurality of shuffled glyphs by randomly shuffling the plurality of original glyphs, the shuffled font comprising the plurality of font characters and the plurality of shuffled glyphs, wherein an $n^{th}$ shuffled glyph of the plurality of shuffled glyphs represents the $n^{th}$ font character;

generating, utilizing the one or more processors, a shuffled string of characters from the original string of characters by replacing an ith character in the original string with the $n^{th}$ font character, where $1 \leq i \leq M$ and M is a length of the original string, responsive to:

the $i^{th}$ character being equal to a $j^{th}$ font character of the plurality of font characters where $1 \leq j \leq N$; and a $j^{th}$ original glyph of the plurality of original glyphs being equal to the $n^{th}$ shuffled glyph;

randomly generating, utilizing the one or more processors, a plurality of patterns;

overlaying, utilizing the one or more processors, each respective pattern of the plurality of patterns on a respective shuffled glyph of the plurality of shuffled glyphs;

sending, utilizing the one or more processors, the shuffled font and the shuffled string to the user; and displaying the shuffled string on a display unit utilizing the shuffled font.

2. An anti-scraping method for protection of text-based data, the text-based data comprising an original string of characters, the anti-scraping method comprising:

receiving, utilizing one or more processors, a request from a user for sending the original string of characters;

generating, utilizing the one or more processors, a shuffled font from an original font responsive to receiving the request from the user for sending the original string of characters, the original font comprising a plurality of font characters and a plurality of original glyphs, wherein:

an $n^{th}$ original glyph of the plurality of original glyphs represents an $n^{th}$ font character of the plurality of font characters where $1 \leq n \leq N$ and N is a number of the plurality of font characters; and generating the shuffled font comprises generating a plurality of shuffled glyphs by randomly shuffling the plurality of original glyphs. the shuffled font comprising the plurality of font characters and the plurality of shuffled glyphs, wherein an $n^{th}$ shuffled glyph of the plurality of shuffled glyphs represents the $n^{th}$ font character;

generating, utilizing the one or more processors, a shuffled string of characters from the original string of characters based on the shuffled font, the shuffled string different from the original string;

sending, utilizing the one or more processors, the shuffled font and the shuffled string to the user;

randomly generating, utilizing the one or more processors, a pattern; and overlaying, utilizing the one or more processors, the pattern on a string of glyphs representing the shuffled string, each respective glyph in a string of glyphs comprising a respective shuffled glyph of the plurality of shuffled glyphs.

3. The anti-scraping method of claim 2, wherein generating the shuffled string comprises replacing an $i^{th}$ character in the original string with the $n^{th}$ font character, where $1 \leq i \leq M$ and M is a length of the original string, responsive to:

the $i^{th}$ character being equal to a $j^{th}$ font character of the plurality of font characters where $1 \leq j \leq N$; and a $j^{th}$ original glyph of the plurality of original glyphs being equal to the $n^{th}$ shuffled glyph.

4. The anti-scraping method of claim 2, further comprising:

extracting, utilizing the one or more processors, the text-based data from a hypertext markup language (HTML) document.

5. The anti-scraping method of claim 2, further comprising:

displaying the shuffled string on a display unit utilizing the shuffled font.

6. A system for protection of text-based data, the text-based data comprising an original string of characters, the system comprising:

a memory having processor-readable instructions stored therein; and one or more processors configured to access the memory and execute the processor-readable instructions, which, when executed by the one or more processors configures the one or more processors to perform a method, the method comprising:

receiving a request from a user for sending the original string of characters;

generating a shuffled font from an original font responsive to receiving the request from the user for sending the original string of characters, the original font comprising a plurality of font characters and a plurality of original glyphs, wherein:

an $n^{th}$ original glyph of the plurality of original glyphs represents an $n^{th}$ font character of the plurality of font characters where $1 \leq n \leq N$ and N is a number of the plurality of font characters; and generating the shuffled font comprises generating a plurality of shuffled glyphs by randomly shuffling the plurality of original glyphs, the shuffled font comprising the plurality of font characters and the plurality of shuffled glyphs. wherein an $n^{th}$ shuffled glyph of the plurality of shuffled glyphs represents the $n^{th}$ font character;

generating a shuffled string of characters from the original string of characters based on the shuffled font, the shuffled string different from the original string;

sending the shuffled font and the shuffled string to the user;

randomly generating a pattern; and overlaying the pattern on a string of glyphs representing the shuffled string, each respective glyph in a string of glyphs comprising a respective shuffled glyph of the plurality of shuffled glyphs.

7. The system of claim 6, wherein generating the shuffled string comprises replacing an $i^{th}$ character in the original string with the $n^{th}$ font character, where $1 \leq i \leq M$ and M is a length of the original string, responsive to:

the $i^{th}$ character being equal to a $j^{th}$ font character of the plurality of font characters where $1 \leq j \leq N$; and a $j^{th}$ original glyph of the plurality of original glyphs being equal to the $n^{th}$ shuffled glyph.

8. The system of claim 6, wherein the method further comprises extracting the text-based data from a hypertext markup language (HTML) document.

9. The system of claim 6, wherein the method further comprises displaying the shuffled string on a display unit utilizing the shuffled font.

* * * * *